Reissued Sept. 2, 1947

Re. 22,911

UNITED STATES PATENT OFFICE 22,911

LUBRICANT

Joseph B. Stucker, Oak Park, Ill., assignor to The Pure Oil Company, Chicago, Ill., a corporation of Ohio No Drawing. Original No. 2,382,115, dated August 14, 1945, Serial No. 451,217, July 16, 1942. Application for reissue July 30, 1946, Serial No. 687,235

14 Claims. (Cl. 252—46.6)

This invention relates to lubricants and is more particularly concerned with lubricants for use in lubricating moving metallic parts which are subjected to extreme pressure conditions such as are encountered in the transmission and differential of automobiles and trucks having hypoid gears.

In Patents Nos. 2,142,998 and 2,211,306 are disclosed lubricants and lubricant additives made by phosphorizing and sulfurizing and phosphorizing fatty bodies. Additives and lubricants made in accordance with these patents have been widely and successfully used for many years for lubrication of hypoid gears and other mechanism in which the lubricant is subjected to extreme pressure conditions.

In recent years, however, a testing machine has been devised known as the S. A. E. testing machine for testing load carrying ability of lubricants. Some automobile manufacturers will not approve a lubricant for use in the transmission and differential of their automobiles unless the lubricant passes the S. A. E. test. Lubricants made in accordance with the aforesaid patents while giving eminently satisfactory service in actual use and while being able to give an extremely high rating on the Timken test give a low rating on the S. A. E. testing machine. Both the Timken and S. A. E. test and the machines used in these tests are widely known and used in the automotive and lubricating oil industries and have been described in various publications. Various additives have been experimented with for producing a lubricant which will not only give good performance under actual service conditions but which will pass the Timken and S. A. E. tests and at the same time not be too corrosive. It has been found difficult, however, to realize all of these conditions for generally those materials which give good S. A. E. tests are corrosive, whereas the materials which give good Timken tests generally do not give good S. A. E. tests and vice versa.

I have discovered a composition which substantially meets the required condition of good performance in service, good Timken and S. A. E. tests and low corrosion. I have discovered that by adding a small amount of an organic polysulfide, particularly an aryl or aralkyl disulfide, to a mineral oil lubricant containing a phosphorized or sulfurized and phosphorized fatty body, the resulting product not only has a satisfactory Timken test but also satisfactory S. A. E. and corrosion tests.

In order to prepare compositions in accordance with my invention it is merely necessary to blend with mineral oil containing the phosphorized or sulfurized-phosphorized fatty body as disclosed and claimed in Patents Nos. 2,142,998 and 2,211,306, the organic polysulfide in amounts of approximately .5 to 5% but preferably 2 to 5% by weight. As organic polysulfides which are useful in accordance with my invention may be mentioned the aryl and aralkyl polysulfides such as dibenzyl disulfide, phenyl disulfide, tolyl disulfide and xenyl disulfide. I may also use polysulfides having more than two sulfur atoms in the molecule. For example I have prepared polysulfides from the disulfides of the various compounds mentioned above by reacting one mol of the disulfide with 1 to 4 mols of sulfur at temperatures of approximately 300 to 310° F. By heating the aryl or aralkyl disulfides with sulfur at this temperature with intermittent stirring for a period of 5 to 10 hours the sulfur can be completely reacted with the disulfide to form polysulfides from which sulfur does not crystallize out upon standing.

In addition to the aryl and aralkyl polysulfides I may use aryl-alkyl polysulfides and aralkyl-aryl polysulfides, aralkyl-alkyl polysulfides, and dialkyl polysulfides. In the case of the di-alkyl polysulfides the alkyl chains should contain at least six carbon atoms in the combined chains and preferably at least six carbon atoms in at least one chain. Thus, although I may use dipropyl di or polysulfides, I prefer to use dihexyl or higher polysulfides.

In order to make a stable lubricating oil blend, the mineral oil containing the phosphorized or sulfurized fatty body is mixed with the poly sulfide and the mixture heated to a temperature of approximately 175 to 190° F. for a period of approximately 30 minutes. If the blending is carried out under these conditions no separation takes place in the material upon standing. In order to obtain a product having desirable characteristics the mineral lubricating oil should be blended with from approximately 10 to 20% of the phosphorized or sulfurized-phosphorized fatty oil E. P. base and with approximately 2 to 5% of the polysulfide. Although lesser amounts of the additives show improved load carrying ability, they will not as a general rule give Timken and S. A. E. tests which are considered high enough to indicate their usefulness under all service conditions. On the other hand amounts of additives in excess of those indicated do not appear to further enhance the load carrying ability of the mineral oil.

A series of tests was made to demonstrate the effect on Timken and S. A. E. tests of additives in accordance with my invention. The results on these tests are tabulated in Table I.

*Table I*

| Test | Oil | Additive | Timken tests at 800 R. P. M. | | S. A. E. tests in lbs. | |
|---|---|---|---|---|---|---|
| | | | Beam load in lbs. | Pressure, lbs. per sq. inch | 1000 R. P. M. | 750 R. P. M. |
| 1 | (1) | | 12 | 7,500 | 60 | 85 |
| 2 | (1) | 18% #1 | 59 | 33,750 | 100 | 145 |
| 3 | (1) | 1% #2 | | | 90 | 85 |
| 4 | (1) | 2% #2 | 25 | 13,000 | 75 | 90 |
| 5 | (1) | 3% #2 | 33 | 14,500 | 90 | [2] 105 |
| 6 | (1) | 5% #2 | 33 | 13,500 | [2] 117.5 | [2] 255 |
| 7 | (1) | 18% #1<br>1% #2 | 51 | 32,750 | 100 | [2] 185 |
| 8 | (1) | 18% #1<br>2% #2 | 51 | 29,750 | [2] 97.5 | [2] 333 |
| 9 | (1) | 18% #1<br>3% #2 | 51 | 23,750 | [2] 315 | 375 |
| 10 | (1) | 18% #1<br>5% #2 | 51 | 29,250 | 550 | |
| 11 | (3) | 18% #1<br>1% #3 | 43 | 26,500 | 265 | |
| 12 | (3) | 18% #1<br>½% #4 | 43 | 27,500 | 175 | |
| 13 | (3) | 18% #1<br>1% #4 | 33 | 26,500 | 265 | |
| 14 | (3) | 18% #1<br>1% #5 | 43 | 24,500 | [2] 200 | |
| 15 | (3) | 18% #1<br>1% #6 | 33 | 24,250 | [2] 162.5 | |
| 16 | (3) | | 18 | 5,000 | (4) | (4) |

[1] 2000 viscosity @ 100° F. Gulf Coast pale.
[2] Average.
[3] 1200 viscosity @ 100° F. Gulf Coast pale.
[4] Seized during run-in.
#1 Lard oil sulfurized and phosphorized in accordance with Patent No. 2,211,306.
#2 Dibenzyl disulfide.
#3 P-ditolyl disulfide reacted with 3 mols sulfur.
#4 Dibenzyl disulfide reacted with 3 mols sulfur.
#5 Dibenzyl disulfide reacted with 2 mols sulfur.
#6 Dibenzyl disulfide reacted with 1 mols sulfur.

A Gulf Coast pale mineral lubricating oil having a viscosity of 2000 seconds Saybolt at 100° F. was used in tests 1 to 10 for the reason that this oil is used as oil stock in commercial lubricants that have been sold for a number of years as extreme pressure lubricants. A Gulf Coast pale mineral lubricating oil having a viscosity of 1200 seconds Saybolt at 100° F. was used in tests 11 to 15. It will be seen from a comparison of tests 1 and 2 that sulfurized-phosphorized lard oil greatly improves the Timken test of the mineral oil, but does not materially improve the S. A. E. test. It is likewise apparent from tests 3 to 6 that dibenzyl disulfide in amounts varying from 1 to 5% improves both the Timken and the S. A. E. to some extent, but not nearly sufficiently to be satisfactory for service. Experience with phosphorized-sulfurized fatty oil type lubricants has shown that when such lubricants carry a beam load of 50 lbs. or more and hold a pressure of approximately 25,000 lbs. per square inch and upward on a Timken machine the lubricant is entirely satisfactory for use under actual service conditions. Those who rely on the S. A. E. test as a measure of load carrying ability of extreme pressure lubricant regard 250 to 300 lbs. at 1000 R. P. M. as being the minimum load which the lubricant should carry, 550 lbs. is the maximum load which the machine will measure at 1000 R. P. M.

From a consideration of the results given in the table it is apparent that the addition of the polysulfide lowers the Timken test to some extent, but does not affect it to such an extent as to bring it below the point which is considered satisfactory. Whereas when sufficient polysulfide is added the S. A. E. test is improved to an extent far beyond that which would be expected from S. A. E. tests 1 to 6. Note particularly the results on tests 9 and 10.

Although polysulfides having more than two sulfur atoms in the molecule have a more marked effect on the S. A. E. test, I prefer to use the disulfides for the reason that the disulfides are not as corrosive and do not affect the Timken test adversely to the same extent as the higher polysulfides. Thus, although it requires a larger amount of the disulfide to achieve the same S. A. E. test as in the case of the higher polysulfide, the extra amount of disulfide used does not adversely affect the Timken test to the same extent as the higher polysulfides do in smaller amounts. Moreover the disulfides are not as corrosive as the higher polysulfides and consequently less wear on the metallic parts is experienced when using the disulfide rather than the higher polysulfides.

In accordance with my invention it is possible by judicious blending of the additives to meet almost any requirements for extreme pressure lubricants. Thus, if both high Timken test and high S. A. E. tests are required with low corrosion, these conditions can be met by blending with the mineral oil 18% by weight of sulfurized phosphorized fatty material and 5% by weight of dibenzyl disulfide. If the emphasis is on the S. A. E. test without the necessity of having a very high Timken test and low corrosion the higher polysulfides such as tri-, tetra-, penta-, and hexa polysulfides may be used. For example I have found that when using dibenzyl disulfide reacted with 3 mols of sulfur in the manner previously set forth the resultant polysulfide when added in the amounts of 2 to 3% by weight to mineral lubricating oil containing 18% of sulfurized phosphorized lard oil will carry the full load on the S. A. E. machine but is somewhat more corrosive than the disulfides.

In order to determine the corrosiveness of a lubricant containing dibenzyl disulfide a metallic copper strip was immersed in this and other lubricants and kept immersed at temperatures of 250 and 300° F. for a period of one hour. The sample of mineral oil containing 18% of sulfurized-phosphorized fatty oil and 3% of dibenzyl disulfide showed no stain or deposit at 250° F. and at 300° F. showed only a light, sooty deposit which was easily removed. After the deposit had been removed the copper beneath appeared unaffected. In comparing this lubricant with mineral oil containing 18% of sulfurized-phosphorized lard oil and no dibenzyl disulfide the corrosions on the two were substantially identical. On the other hand a sample made by blending enough sulfur in the mineral oil containing 18% of sulfurized-phosphorized lard oil to give a comparable S. A. E. test produced a heavy black deposit which wiped off easily at 250° F., but which stained the copper strip. At 300° F. this lubricant gave the same type of deposit and stain as at 250° only both were heavier.

A number of commercial additives were also tested by adding to mineral oil containing 18% of sulfurized-phosphorized lard oil, sufficient additive to obtain the desired S. A. E. test and in each case the copper strip corrosion tests showed considerable deposit and staining.

Thus, I have discovered lubricant compositions which meet the required laboratory and service tests without having the disadvantages which are inherent in other lubricants.

What is claimed is:

1. A lubricant comprising a major portion of mineral lubricating oil and minor proportions of substances selected from groups 1 and 2, group 1 consisting of sulfurized-phosphorized and phosphorized fatty material, group 2 consisting of organic polysulfides in which the sulfur is linked between two radicals of the group consisting of aryl, aralkyl and alkyl radicals, excluding dialkyl polysulfides having fewer than 6 carbon atoms in the combined alkyl radicals, the material from group 2 being present in amount from about 2 to 5 per cent which amount is smaller than the proportion of material from group 1, the materials from groups 1 and 2 being present in amounts sufficient to improve materially the load carrying ability of the mineral lubricating oil.

2. A lubricant in accordance with claim 1 in which the substance from group 1 is present in amounts of 10 to 20% by weight based on the mineral oil and the substance from group 2 is present in amounts of approximately 3 to 5% by weight of the mineral oil.

3. A lubricant in accordance with claim 1 in which the substance from group 2 is an aralkyl polysulfide.

4. A lubricant in accordance with claim 1 in which the substance from group 2 is an aralkyl disulfide.

5. A lubricant in accordance with claim 1 in which the substance from group 2 is dibenzyl disulfide.

6. A lubricant in accordance with claim 1 in which the substance from group 1 is sulfurized and phosphorized lard oil in the amount of 10 to 20% by weight of the mineral oil and the substance from group 2 is dibenzyl disulfide in the amount of 3 to 5% by weight of the mineral oil.

7. A lubricating oil in accordance with claim 1 in which the substance from group 2 is an aryl polysulfide.

8. A lubricating oil in accordance with claim 1 in which the substance from group 1 is a sulfurized and phosphorized fatty oil and the substance from group 2 is an aralkyl polysulfide.

9. A lubricating oil in accordance with claim 1 in which the substance from group 1 is sulfurized and phosphorized lard oil in amounts of 10 to 20% by weight and the substance from group 2 is an aralkyl polysulfide, having more than 2 sulfur atoms per molecule.

10. A lubricant comprising a major portion of mineral lubricating oil, and minor proportions of substances selected from each of groups 1 and 2, group 1 consisting of sulfurized-phosphorized and phosphorized fatty material, group 2 consisting of organic polysulfides in which the sulfur is linked between two radicals of the group consisting of aryl, aralkyl and alkyl radicals, excluding dialkyl polysulfides having fewer than 6 carbon atoms in the combined alkyl radicals, the material from group 2 being present in amount from about 0.5 to 5 per cent, which amount is smaller than the amount of material from group 1, the materials from groups 1 and 2 being present in amounts sufficient to improve materially the load-carrying capacity of the mineral lubricating oil.

11. A lubricant in accordance with claim 10 in which the substance from group 1 is present in amounts of 10 to 20% by weight based on the mineral oil and the substance from group 2 is present in amounts of approximately 0.5 to 5% by weight of the mineral oil.

12. A lubricant in accordance with claim 10 in which the substance from group 2 is dibenzyl disulfide.

13. A lubricant in accordance with claim 10 in which the substance from group 1 is sulfurized and phosphorized lard oil in the amount of 10 to 20% by weight of the mineral oil and the substance from group 2 is dibenzyl disulfide in the amount of about 0.5 to 5% by weight of the mineral oil.

14. A lulbricating oil in accordance with claim 10 in which the substance from group 2 is an aryl polysulfide.

JOSEPH B. STUCKER.

REFERENCES CITED

The following references are of record in the file of this patent:

UNITED STATES PATENTS

| Number | Name | Date |
|---|---|---|
| 2,254,337 | Whittier | Sept. 2, 1941 |
| 2,322,209 | Prutton | June 22, 1943 |